US008908331B2

(12) United States Patent
Shimazawa

(10) Patent No.: US 8,908,331 B2
(45) Date of Patent: Dec. 9, 2014

(54) THERMALLY-ASSISTED MAGNETIC RECORDING HEAD INCLUDING A WAVEGUIDE, A MAGNETIC POLE, AND A PLASMON GENERATOR AND METHOD OF MANUFACTURING THE SAME

(71) Applicant: TDK Corporation, Tokyo (JP)

(72) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 2 days.

(21) Appl. No.: 13/746,771

(22) Filed: Jan. 22, 2013

(65) Prior Publication Data

US 2014/0204723 A1 Jul. 24, 2014

(51) Int. Cl.
G11B 5/147 (2006.01)
G11B 5/187 (2006.01)
G11B 5/31 (2006.01)
G11B 5/60 (2006.01)
G11B 5/00 (2006.01)

(52) U.S. Cl.
CPC .............. *G11B 5/314* (2013.01); *G11B 5/6088* (2013.01); *G11B 2005/0021* (2013.01)
USPC ..................... 360/125.31; 360/122; 369/13.33

(58) Field of Classification Search
USPC .................. 360/125.31, 125.74, 122, 125.02, 360/125.06; 369/13.33
See application file for complete search history.

(56) References Cited

U.S. PATENT DOCUMENTS

| 7,359,599 B2* | 4/2008 | Matsumoto ..................... 385/47 |
| 7,791,839 B2* | 9/2010 | Olson et al. .............. 360/125.31 |
| 8,092,704 B2* | 1/2012 | Balamane et al. .............. 216/57 |
| 8,169,881 B2* | 5/2012 | Balamane et al. ........ 369/112.27 |
| 8,325,570 B1* | 12/2012 | Tanaka et al. .............. 369/13.33 |
| 8,339,740 B2* | 12/2012 | Zou et al. ................. 360/125.31 |
| 8,385,021 B2* | 2/2013 | Hara et al. ............... 360/125.31 |
| 8,416,530 B2* | 4/2013 | Gao et al. ................. 360/125.31 |
| 8,472,286 B2* | 6/2013 | Stipe .......................... 369/13.33 |
| 8,630,153 B1* | 1/2014 | Wang et al. ................. 369/13.33 |
| 2007/0230010 A1* | 10/2007 | Jin et al. ........................ 360/69 |
| 2007/0286031 A1* | 12/2007 | Matsumoto ................ 369/13.13 |
| 2011/0310713 A1* | 12/2011 | Komura et al. ............ 369/13.24 |
| 2012/0084969 A1 | 4/2012 | Tanaka et al. |
| 2014/0016448 A1* | 1/2014 | Challener et al. .......... 369/13.33 |

OTHER PUBLICATIONS

U.S. Appl. No. 13/363,795, filed Feb. 1, 2012.
U.S. Appl. No. 13/568,542, filed Aug. 7, 2012.

* cited by examiner

Primary Examiner — Jefferson Evans
(74) Attorney, Agent, or Firm — Oliff PLC

(57) ABSTRACT

This thermally-assisted magnetic recording head includes: a waveguide having a first end surface included in an air bearing surface; a magnetic pole having a second end surface included in the air bearing surface; a plasmon generator having a third end surface included in the air bearing surface; a first film covering the first end surface of the waveguide and the second end surface of the magnetic pole, and having an opening in a region corresponding to the third end surface of the plasmon generator; and a second film filling the opening and covering the third end surface of the plasmon generator.

22 Claims, 10 Drawing Sheets

THERMALLY-ASSISTED MAGNETIC RECORDING HEAD INCLUDING A WAVEGUIDE, A MAGNETIC POLE, AND A PLASMON GENERATOR AND METHOD OF MANUFACTURING THE SAME

BACKGROUND OF THE INVENTION

1. Field of the Invention

The invention relates to a thermally-assisted magnetic recording head used in thermally-assisted magnetic recording in which near-field light is applied to lower a coercivity of a magnetic recording medium so as to record information, and to a head gimbals assembly, a head arm assembly, and a magnetic disk unit that are mounted with the thermally-assisted magnetic recording head.

2. Description of Related Art

A magnetic disk unit has been used for writing and reading magnetic information (hereinafter, simply referred to as information). The magnetic disk unit includes, in a housing thereof for example, a magnetic disk in which information is stored, and a magnetic read write head that records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and includes a magnetic write element and a magnetic read element that have an air bearing surface (ABS) facing the magnetic disk. In particular, an MR element exhibiting magnetoresistive effect (MR) is generally used as the magnetic read element. The other end of the suspension is attached to an end of an arm pivotally supported by a fixed shaft installed upright in the housing.

When the magnetic disk unit is in a stationary state, namely, when the magnetic disk does not rotate and remains stationary, the magnetic read recording head is not located over the magnetic disk and is pulled off to the outside (unload state). When the magnetic disk unit is in a driven state and the magnetic disk starts to rotate, the magnetic read recording head is changed to a state where the magnetic read recording head is moved to a predetermined position over the magnetic disk together with the suspension (load state). When the number of rotation of the magnetic disk reaches a predetermined number, the magnetic head slider is stabilized in a state of slightly floating over the surface of the magnetic disk due to the balance of positive pressure and negative pressure. Thus, information is accurately recorded and reproduced.

In recent years, along with a progress in higher recording density (higher capacity) of the magnetic disk, improvement in performance of the magnetic read recording head and the magnetic disk has been demanded. The magnetic disk is a discontinuous medium including collected magnetic microparticles, and each magnetic microparticle has a single-domain structure. In the magnetic disk, one recording bit is configured of a plurality of magnetic microparticles. Since the asperity of a boundary between adjacent recording bits needs to be made small in order to increase the recording density, it is necessary to reduce a size of the magnetic microparticles. However, when the magnetic microparticles are made small in size, thermal stability of the magnetization of the magnetic microparticles is disadvantageously lowered with decreasing volume of the magnetic microparticles. To solve this issue, it is effective to increase anisotropy energy of the magnetic microparticle. However, increasing the anisotropy energy of the magnetic microparticle leads to increase in the coercivity of the magnetic disk. As a result, difficulty occurs in the existing magnetic head in that the information recording becomes difficult.

As a method to solve the above-described difficulty, a method referred to as a so-called thermally-assisted magnetic recording has been proposed. In this method, a magnetic recording medium with large coercivity is used, and when information is written, heat is applied together with the magnetic field to a section of the magnetic recording medium where the information is to be written to increase the temperature and lower the coercivity of that section, thereby writing the information. Hereinafter, the magnetic head used in the thermally-assisted magnetic recording is referred to as a thermally-assisted magnetic recording head.

In performing the thermally-assisted magnetic recording, near-field light is generally used for applying heat to a magnetic recording medium. For example, in Japanese Unexamined Patent Application Publication No. 2001-255254 and in Japanese Patent No. 4032689, disclosed is a technology of allowing a frequency of light to coincide with a resonant frequency of plasmons that are generated in a metal, by directly applying light to a plasmon generator in order to generate near-field light. In the method of directly applying light to a plasmon generator, however, the plasmon generator itself overheats and accordingly deforms depending on usage environment or conditions, making it difficult to achieve practical realization.

As a technology capable of avoiding such overheating, Japanese Patent No. 4104584 proposes a thermally-assisted head using surface plasmon polariton coupling. In this technology, light propagating through a waveguide (guided light) is not directly applied to a plasmon generator, but the guided light is coupled to the plasmon generator through evanescent coupling, and surface plasmon polaritons generated on a surface of the plasmon generator are utilized.

The thermally-assisted magnetic recording head that utilizes the surface plasmon polariton suppresses a rise in temperature of the plasmon generator to some extent. However, it was confirmed that, when Au (gold) is used to configure the plasmon generator for example, there are cases where contraction (agglomeration) resulting from heat occurs especially in a section, near the ABS, where a volume is low and where the heat concentrates.

Such agglomeration is considered to be a phenomenon caused by gold configuring the plasmon generator not being in a stabled state such as a bulk state. That is, since gold formed through a plating method, a sputtering method, or the like is low in density, it is considered that a rise in temperature upon operation of the thermally-assisted magnetic recording head increases the density thereof, and a crystalline structure thereof advances toward a stabilized state.

Hence, it is desirable that a heat treatment be performed in advance during manufacturing to stabilize the crystalline structure of a material (such as gold) configuring the plasmon generator.

On the other hand, since the thermally-assisted magnetic recording head is usually provided together with a magnetic read head that includes the MR element, it is desirable that a heat treatment at a temperature that thermally damages operation performance of the MR element be avoided. Therefore, sufficiently stabilizing a crystalline structure of a constituent material of the plasmon generator to sufficiently suppress the agglomeration thereof upon operation is virtually difficult. When such agglomeration occurs, an end section of the plasmon generator is recessed from the ABS and is away from a magnetic recording medium, incurring a decrease in recording performance.

For the foregoing reasons, what is desired is a thermally-assisted magnetic recording head capable of suppressing agglomeration of a plasmon generator upon operation and performing higher-density magnetic recording.

SUMMARY OF THE INVENTION

A thermally-assisted magnetic recording head according to an embodiment of the invention includes: a waveguide having a first end surface included in an air bearing surface; a magnetic pole having a second end surface included in the air bearing surface; a plasmon generator having a third end surface included in the air bearing surface; a first film covering the first end surface of the waveguide and the second end surface of the magnetic pole, and having an opening in a region corresponding to the third end surface of the plasmon generator; and a second film filling the opening and covering the third end surface of the plasmon generator.

A head gimbals assembly, a head arm assembly, and a magnetic disk unit according to embodiments of the invention each include the above-described thermally-assisted magnetic recording head.

A method of manufacturing a thermally-assisted magnetic recording head according to an embodiment of the invention includes: forming an air bearing surface through polishing an end surface of a multilayer, the multilayer including a waveguide, a magnetic pole, and a plasmon generator; so forming a first film as to cover the air bearing surface; forming an opening through selectively removing a part, of the first film, that covers the plasmon generator; and so forming a second film as to fill the opening and to cover an end surface, included in the air bearing surface, of the plasmon generator.

In the thermally-assisted magnetic recording head, the head gimbals assembly, the head arm assembly, and the magnetic disk unit each of which includes the same, as well as the method of manufacturing the thermally-assisted magnetic recording head according to the embodiments of the invention, the third end surface of the plasmon generator is covered with the second film that is different from the first film that covers the first end surface of the waveguide and the second end surface of the magnetic pole. Thus, even when gold is used to configure the plasmon generator for example, its agglomeration arising from a rise in temperature of the plasmon generator upon operation is suppressed. As a result, higher-density magnetic recording is possible, and the product lifetime increases.

Here, advantageously, the first film may be formed of a first nonconductive material, and the second film may be formed of a second nonconductive material different therefrom. For example, advantageously, the first nonconductive material may be formed substantially of diamond-like carbon, and the second nonconductive material may be formed substantially of tantalum oxide ($TaO_x$).

Alternatively, advantageously, the second film may contain one or more metal elements alloyable with a component element of the plasmon generator. In this case, advantageously, the component element of the plasmon generator may be Au (gold) for example, and the metal element(s) of the second film may be selected from a group consisting of Cu, Co, Ni, Fe, Ta, Mg, Cr, Ti, Ag, Pt, Pd, Ru, and Al.

Also, a third film containing silicon nitride ($Si_3N_4$) may be so provided as to cover the first film and the second film.

DETAILED DESCRIPTION OF THE PREFERRED EMBODIMENTS

Embodiment

Hereinafter, an embodiment of the invention will be described in detail with reference to the drawings.

[1. Configuration of Magnetic Disk Unit]

First, referring to FIG. 1 and FIG. 2, a configuration of a magnetic disk unit according to an embodiment of the invention will be described below.

Figure 1:
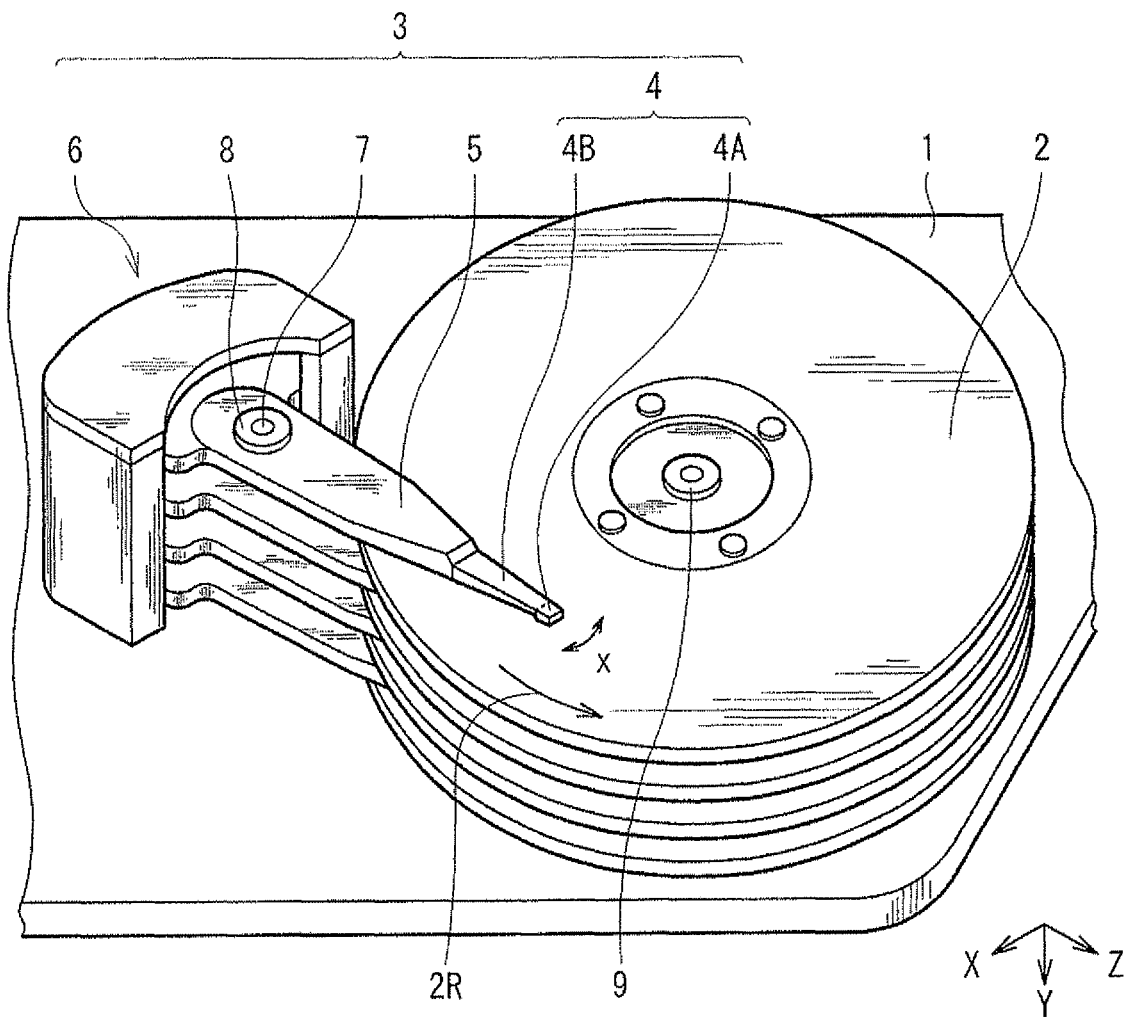
FIG. 1 is a perspective view illustrating a configuration of a magnetic disk unit provided with a magnetic read recording head according to an embodiment of the invention.

FIG. 1 is a perspective view illustrating an internal configuration of the magnetic disk unit according to the present embodiment. The magnetic disk unit adopts a load-unload (load/unload) system as a driving system, and includes, in a housing 1 for example, a magnetic disk 2 as a magnetic recording medium in which information is to be written, and a head arm assembly (HAA) 3 for writing information in the magnetic disk 2 and reading the information therefrom. The HAA 3 includes a head gimbals assembly (HGA) 4, an arm 5 supporting a base of the HGA 4, and a driver 6 as a drive power source for allowing the arm 5 to pivot. The HGA 4 includes a thermally-assisted magnetic head device (hereinafter, simply referred to as a "magnetic head device") 4A having a side surface provided with a magnetic read recording head 10 (described later) according to the present embodiment, and a suspension 4B having an end provided with the magnetic head device 4A. The other end of the suspension 4B (an end opposite to the end provided with the magnetic head device 4A) is supported by the arm 5. The arm 5 is so configured as to be pivotable, through a bearing 8, around a fixed shaft 7 fixed to the housing 1. The driver 6 may be configured of, for example, a voice coil motor. Incidentally, the magnetic disk unit has one or a plurality of (FIG. 1 exemplifies the case of four) magnetic disks 2, and the magnetic head devices 4A are disposed corresponding to recording surfaces (a front surface and a back surface) of the respective magnetic disks 2. Each of the magnetic head devices 4A is movable in a direction across write tracks, that is, in a track width direction (in an X-axis direction) in a plane parallel to the recording surfaces of each of the magnetic disks 2. On the other hand, the magnetic disk 2 rotates around a spindle motor 9 fixed to the housing 1 in a rotation direction 2R substantially orthogonal to the X-axis direction. With the rotation of the magnetic disk 2 and the movement of a the magnetic head devices 4A, information is written into the magnetic disk 2 or stored information is read out. Further, the magnetic disk unit has a control circuit (described later) that controls a write operation and a read operation of the magnetic read recording head 10, and an emission operation of a laser diode as a light source that generates laser light used for thermally-assisted magnetic recording described later.

Figure 2:
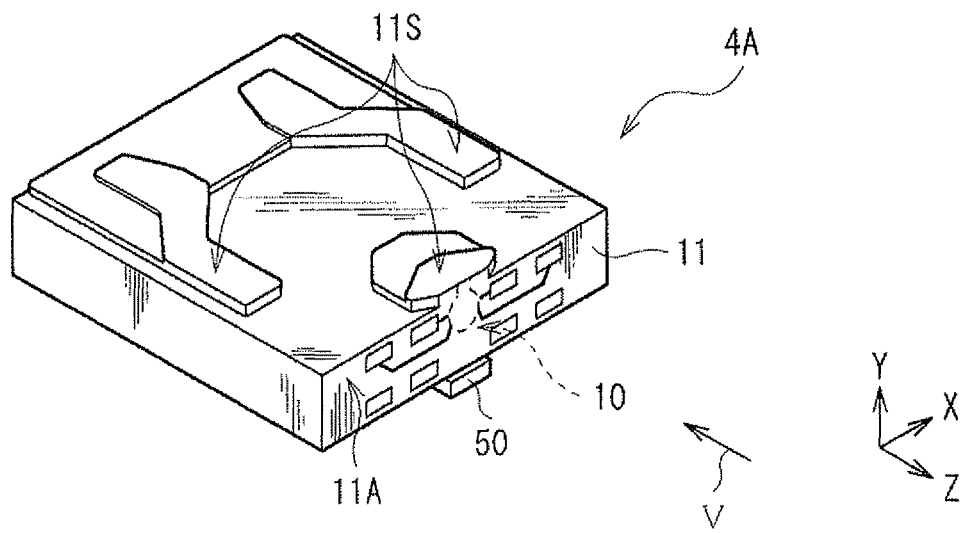
FIG. 2 is a perspective view illustrating a configuration of a slider in the magnetic disk unit illustrated in FIG. 1.

FIG. 2 illustrates a configuration of the magnetic head device 4A illustrated in FIG. 1. The magnetic head device 4A has a block-shaped slider 11 which may be formed of, for example, $Al_2O_3$.TiC (AlTiC). The slider 11 may be substantially formed as a hexahedron, for example, and one surface thereof corresponds to an ABS 11S that is disposed in proximity to and to face the recording surface of the magnetic disk 2. When the magnetic disk unit is not driven, namely, when the spindle motor 9 is stopped and the magnetic disk 2 does not rotate, the magnetic head device 4A is pulled off to the position away from an above part of the magnetic disk 2 (unload state), in order to prevent contact of the ABS 11S and the recording surface. On the other hand, upon activation, the magnetic disk 2 starts to rotate at a high speed by the spindle motor 9, and the arm 5 is pivotably moved around the fixed shaft 7 by the driver 6, allowing the magnetic head device 4A to move above the front surface of the magnetic disk 2 to be in a load state. The high-speed rotation of the magnetic disk 2 causes an air flow between the recording surface and the ABS 11S, and the resulting lift force leads to a state where the magnetic head device 4A floats to maintain a certain distance (magnetic spacing) in a direction (a Y-axis direction) orthogonal to the recording surface. Also, an element forming surface 11A that is one side surface orthogonal to the ABS 11S is provided with the magnetic read recording head 10. Incidentally, a surface 11B opposite to the ABS 11S of the slider 11 is provided with a light source unit 50 near the magnetic read recording head 10.

[2. Detailed Structure of Magnetic Read Recording Head]

Next, the magnetic read recording head 10 is described in more detail with reference to FIG. 3 to FIG. 6.

Figure 3:
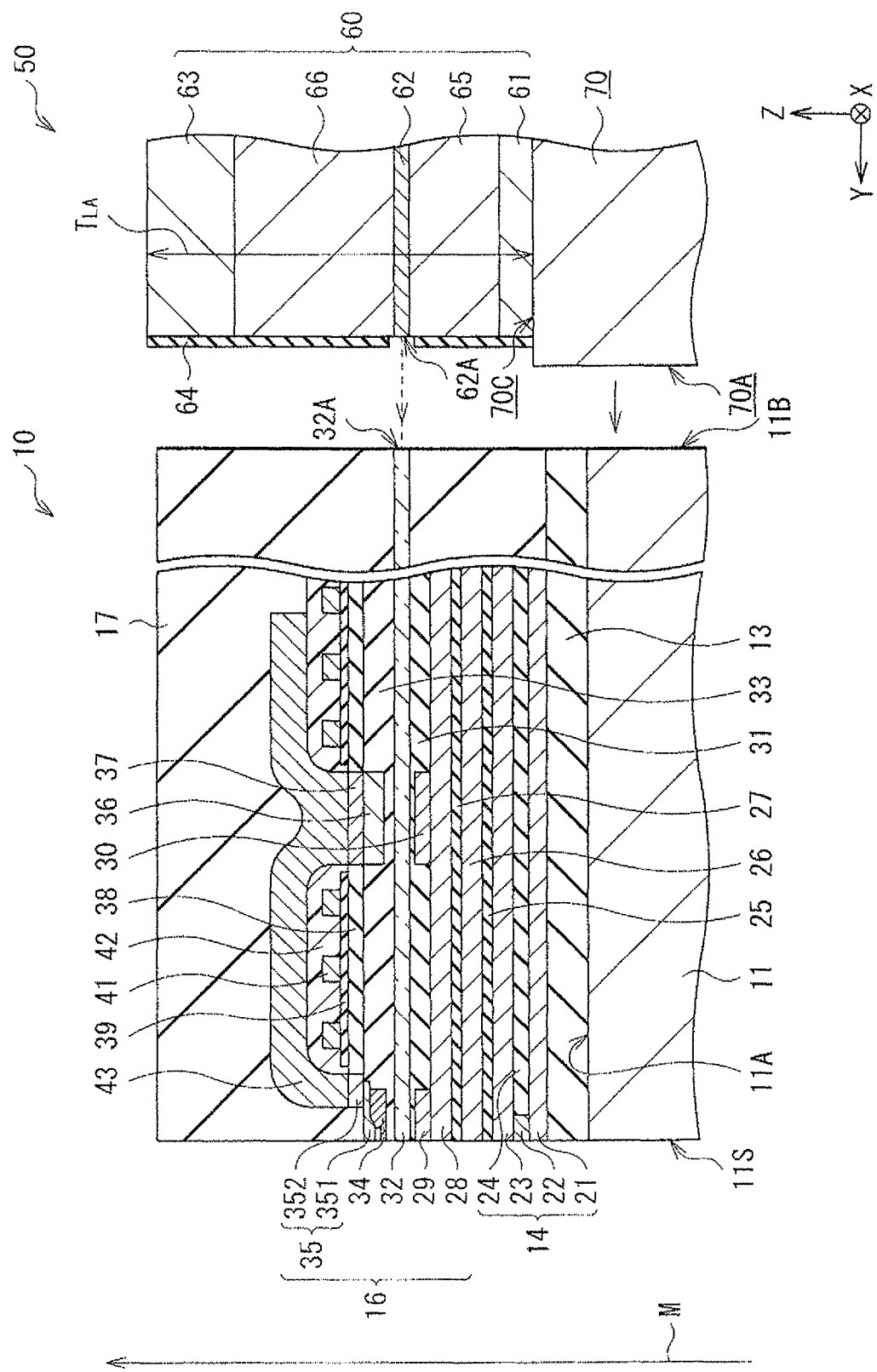
FIG. 3 is a sectional view illustrating a structure of a cross-sectional surface (an YZ cross-sectional surface) orthogonal to an air bearing surface in the magnetic read recording head illustrated in FIG. 2.
Figure 4:
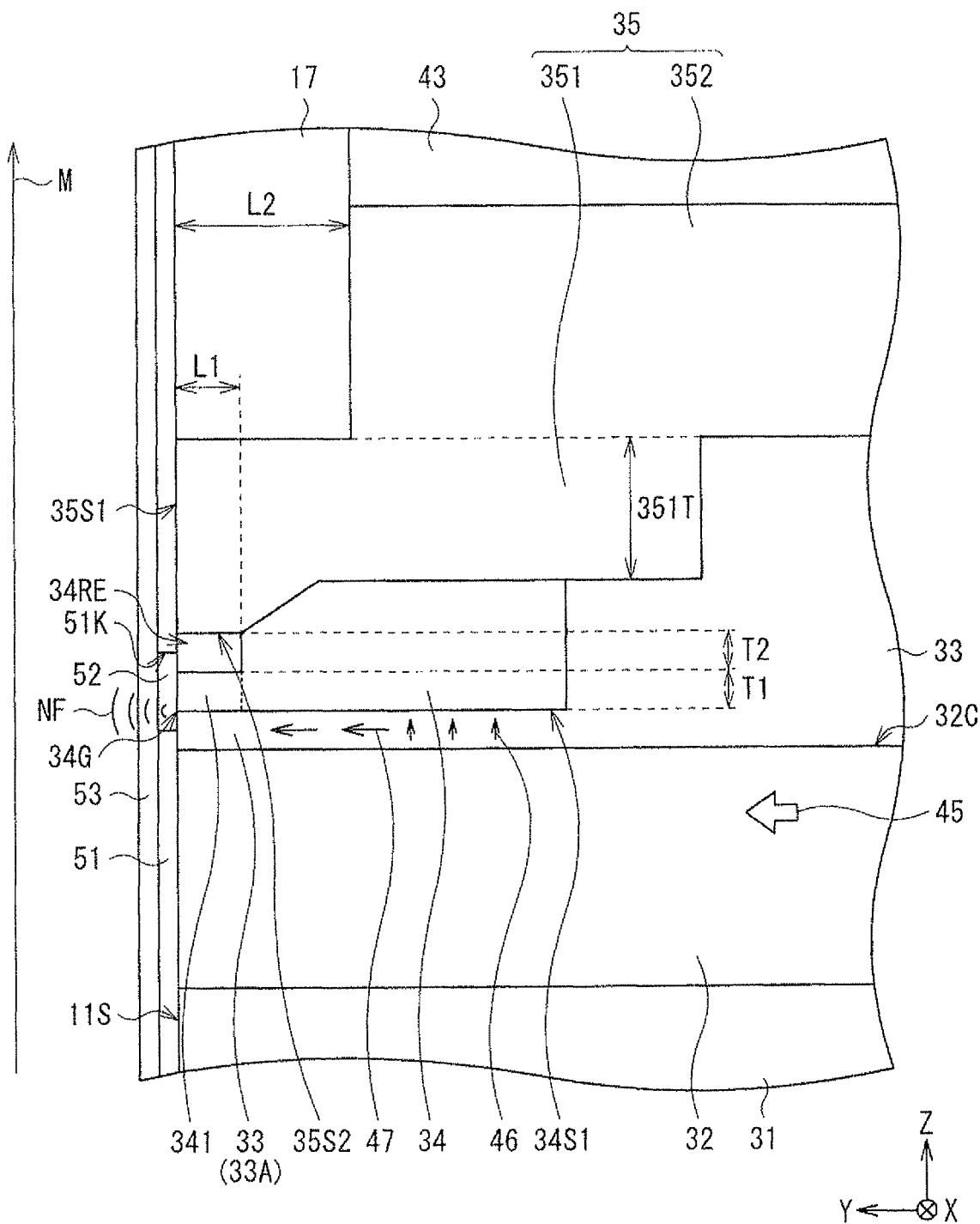
FIG. 4 is a sectional view illustrating a main part of the magnetic read recording head illustrated in FIG. 3 in an enlarged manner.
Figure 5:
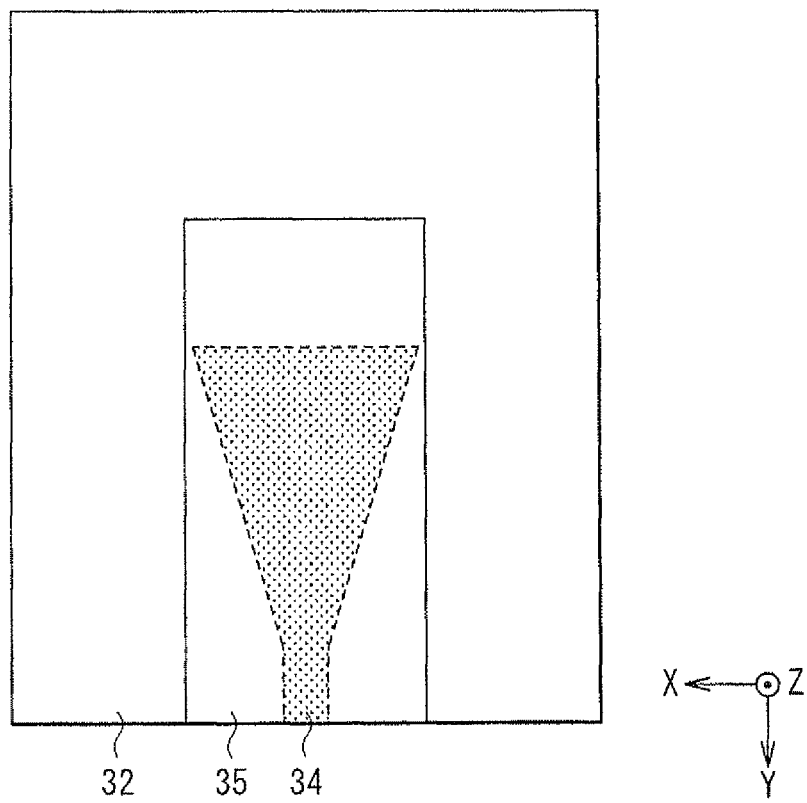
FIG. 5 is a schematic diagram illustrating a shape in an XY plane of the main part of the magnetic read recording head.
Figure 6:
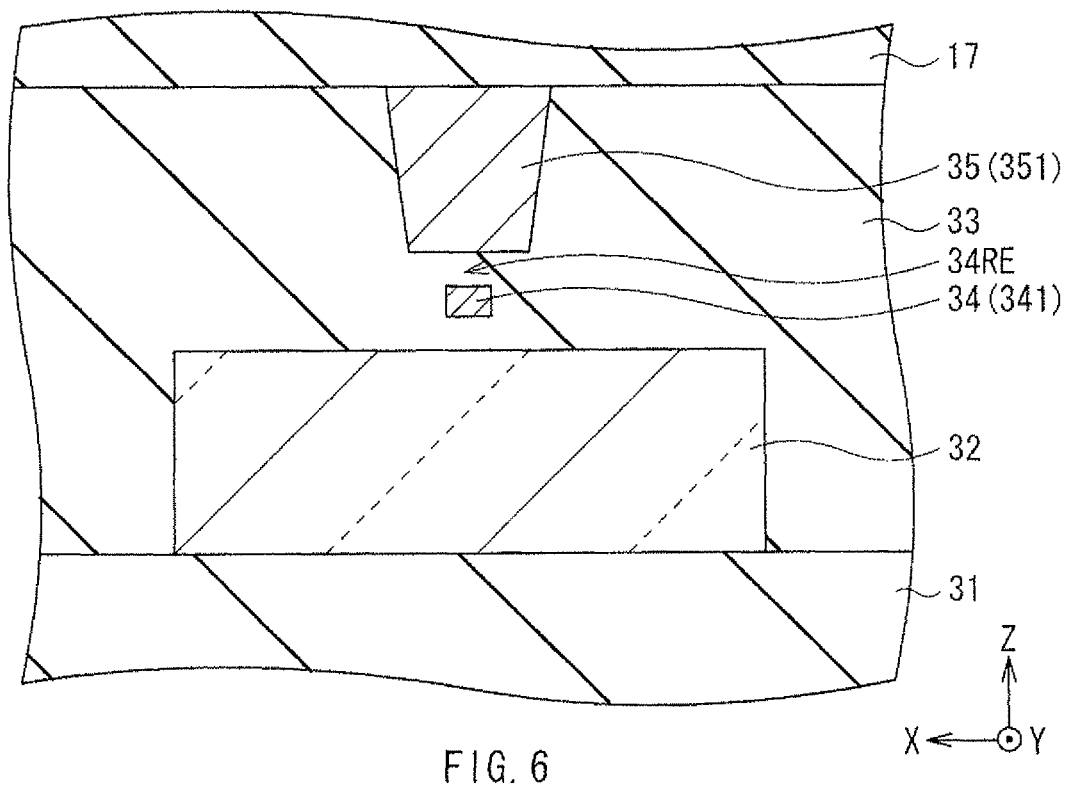
FIG. 6 is a schematic diagram illustrating a structure of an end surface exposed on the air bearing surface, in the main part of the magnetic read recording head.

FIG. 3 is a sectional view of the magnetic read recording head 10 illustrated in FIG. 2 in the Y-Z cross-sectional surface orthogonal to the ABS 11S, and FIG. 4 is an enlarged sectional view of a main part illustrating a part of FIG. 3. FIG. 5 is a schematic diagram illustrating a planar structure of a main part of the magnetic read recording head 10 as viewed from an arrow V direction illustrated in FIG. 2. FIG. 6 illustrates a part of an end surface exposed on the ABS 11S in an enlarged manner.

Note that an up-arrow M illustrated in FIG. 3 and FIG. 4 indicates a direction in which the magnetic disk 2 moves relative to the magnetic read recording head 10.

In the following description, dimensions in the X-axis direction, the Y-axis direction, and the Z-axis direction are referred to as a "width", a "height" or a "length", and a "thickness", respectively, and a closer side and a farther side to/from the ABS 1 IS in the Y-axis direction are referred to as "front" and "back", respectively. Moreover, forward and backward in the direction of the arrow M are referred to as a "trailing side" and a "leading side", respectively, and the X-axis direction and the Z-axis direction are referred to as a "cross track direction" and a "down track direction", respectively.

The magnetic read recording head 10 has a multilayer structure including an insulating layer 13, a read head section 14, a recording head section 16, and a protective layer 17 which are stacked in order on the slider 11. Each of the read head section 14 and the recording head section 16 has an end surface exposed on the ABS 11S.

The read head section 14 uses magneto-resistive effect (MR) to perform a read process. The read head section 14 may be configured by stacking, for example, a lower shield layer 21, an MR element 22, and an upper shield layer 23 in this order on the insulating layer 13.

The lower shield layer 21 and the upper shield layer 23 may be respectively made of a soft magnetic metal material such as NiFe (nickel iron alloy) for example, and are disposed to face each other with the MR element 22 in between in the stacking direction (in the Z-axis direction). This exhibits a function of protection such that an influence of an unnecessary magnetic field does not reach the MR element 22.

One end surface of the MR element 22 is exposed on the ABS 11S, and the other end surfaces thereof are in contact with an insulating layer 24 that fills a space between the lower shield layer 21 and the upper shield layer 23. The insulating layer 24 is made of an insulating material such as $Al_2O_3$ (aluminum oxide), AlN (aluminum nitride), $SiO_2$ (silicon dioxide), and DLC (diamond-like carbon).

The MR element 22 functions as a sensor for reading magnetic information written in the magnetic disk 2. Note that in the present embodiment, in a direction (the Y-axis direction) orthogonal to the ABS 11S, a direction toward the ABS 11S from the MR element 22 or a position near the ABS 11S is referred to as a "forward", and a direction toward a side opposite to the ABS 11S from the MR element 22 or a position away from the ABS 11S is referred to as a "backward". The MR element 22 may be, for example, a CPP (Current Perpendicular to Plane)—GMR (Giant Magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes in response to a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change in the magnetization directions appears as the change in the electric resistance, and thus, the signal magnetic field is detected with use of the change and the magnetic information is accordingly read out.

An insulating layer 25, an intermediate shield layer 26, and an insulating layer 27 are stacked in order on the read head section 14. The intermediate shield layer 26 functions to prevent a magnetic field generated in the recording head section 16 from reaching the MR element 22, and may be made of, for example, a soft magnetic metal material such as NiFe. The insulating layers 25 and 27 each may be formed by the similar material to that of the insulating layer 24, for example.

The recording head section 16 is a perpendicular magnetic recording head that performs a writing process of thermally-assisted magnetic recording system. The recording head section 16 may have, for example, a lower yoke layer 28, a leading shield 29 and a connecting layer 30, a cladding layer 31, a waveguide 32, and a cladding layer 33 in order on the insulating layer 27. Note that a configuration may be employed where the leading shield 29 is omitted.

The lower yoke layer 28, the leading shield 29, and the connecting layer 30 are each made of a soft magnetic metal material such as NiFe. The leading shield 29 is located at a most forward part of the upper surface of the lower yoke layer 28, and is so arranged that one end surface thereof is exposed on the ABS 11S. The connecting layer 30 is located at the backward of the leading shield 29 on the upper surface of the lower yoke layer 28.

The cladding layer 31 is so provided as to cover the lower yoke layer 28, the leading shield 29, and the connecting layer 30.

The waveguide 32 provided on the cladding layer 31 extends in a direction (the Y-axis direction) orthogonal to the ABS 11S. For example, one end surface thereof may be exposed on the ABS 11S, and the other end surface thereof may be exposed at the backward thereof. Note that the forward end surface of the waveguide 32 may be located at a position recessed from the ABS 11S without being exposed on the ABS 11S. The waveguide 32 is formed by a dielectric material that allows laser light to pass therethrough. Specifically, the waveguide 32 may be made of a material containing essentially one or more of, for example, SiC, DLC, TiOx (titanium oxide), TaOx (tantalum oxide), SiNx (silicon nitride), $SiO_xN_y$ (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Containing essentially means that the above-described materials are contained as main components and other materials may be contained as subcomponents (for example, impurity) as long as a refractive index higher than those of the cladding layers 31 and 33 is provided. The waveguide 32 allows laser light from a laser diode 60 (described later) to propagate toward the ABS 11S. Incidentally, although the cross-sectional shape parallel to the ABS 11S of the waveguide 32 is a rectangular as illustrated in FIG. 6, for example, it may have other shapes.

The cladding layers 31 and 33 are each formed of a dielectric material having a refractive index, with respect to laser light propagating through the waveguide 32, lower than that of the waveguide 32. The cladding layers 31 and 33 each may be made of a material containing essentially (substantially) one or more of, for example, SiOx (silicon oxide), $Al_2O_3$ (aluminum oxide), AlN (aluminum nitride), BeO (berylium oxide), SIC (silicon carbide), and DLC (diamond-like carbon). Containing essentially means that the above-described materials are contained as main components and the other materials may be contained as subcomponents (for example, impurity) as long as a refractive index lower than that of the waveguide 32 is provided.

The recording head section 16 further includes a plasmon generator 34 provided above the forward end of the waveguide 32 with the cladding layer 33 in between, and a magnetic pole 35 provided above the plasmon generator 34.

The plasmon generator 34 is disposed in such a manner that one end surface of the forward end 341 is exposed on the ABS 11S. The plasmon generator 34 is provided with a recessed section 34RE recessed from the ABS 11S by a length L1.

Thus, the forward end 341 of the plasmon generator 34 is surrounded by the cladding layer 33, and is separated away from the forward end of the waveguide 32 and a forward end of a first layer 351 (described later) of the magnetic pole 35.

A constituent material of the plasmon generator 34 may be a conductive material containing one or more of, for example, Pd (palladium), Pt (platinum), Rh (rhodium), Ir (iridium), Ru (ruthenium), Au (gold), Ag (silver), Cu (copper), and aluminum (Al). Among these, Au is especially desirable since this makes it possible to generate near-field light NF (described later) more efficiently. Note that the cross-sectional shape of the plasmon generator 34 parallel to the ABS 11S is rectangular as illustrated in FIG. 6, for example, however, it may have other shapes. In addition, the forward end 341 may have, for example, a thickness T1 of 10 nm or more and 80 nm or less, and the length L1 of 40 nm or more and 150 nm or less. Moreover, a gap between the forward end 341 and a counter surface 3552 of the magnetic pole 35, namely, a thickness T2 of the recessed section 34RE may be, for example, 10 nm or more and 50 nm or less. The magnetic pole 35 has a structure in which the first layer 351 and a second layer 352 are stacked in order on the plasmon generator 34. The first layer 351 has an end surface 3551 exposed on the air bearing surface, and the counter surface 3552 facing the plasmon generator 34. The second layer 352 extends backward from a position recessed from the ABS 11S by a length L2 (>L1).

Each of the first layer 351 and the second layer 352 may be made of a magnetic material with high saturation flux density such as iron-based alloy, for example. Examples of the iron-based alloy include FeCo (iron cobalt alloy), FeNi (iron nickel alloy), and FeCoNi (iron cobalt nickel alloy). Incidentally, although a cross-sectional shape of the first layer 351 parallel to the ABS 11S is an inverted trapezoid as illustrated in FIG. 6, for example, it may have other shapes.

The plasmon generator 34 generates the near-field light NF from the ABS 11S, based on the laser light which has propagated through the waveguide 32. The magnetic pole 35 stores therein magnetic flux generated in a coil 41 (described later), and releases the magnetic flux from the ABS 11S to thereby generate a write magnetic field for writing magnetic information into the magnetic disk 2. The plasmon generator 34 and the first layer 351 are embedded in the cladding layer 33.

The recording head section 16 further includes a connecting layer 36 embedded in the cladding layer 33 at the backward of the plasmon generator 34 and the magnetic pole 35, and a connecting layer 37 so provided as to be in contact with an upper surface of the connecting layer 36. The connecting layers 36 and 37 are located above the connecting layer 30, and are made of a soft magnetic metal material such as NiFe. Note that the connecting layer 36 is magnetically connected by a connection section (not illustrated) which may be formed of, for example, a soft magnetic metal material such as NiFe.

As illustrated in FIG. 3, an insulating layer 38 is so provided on the cladding 33 as to fill surroundings of the second layer 352 of the magnetic pole 35. An insulating layer 39 and the coil 41 that is formed in spiral around the connecting layer 37 are stacked in order on the insulating layer 38. The coil 41 generates recording-use magnetic flux by a write current flowing therethrough, and is formed by a high conductive material such as Cu (copper) and Au (gold). The insulating layers 38 and 39 are each made of an insulating material such as $Al_2O_3$, MN, $SiO_2$ and DLC. The insulating layer 38, the insulating layer 39, and the coil 41 are covered with an insulating layer 42. Further, an upper yoke layer 43 is so provided as to cover the insulating layer 42. The insulating layer 42 may be made of, for example, a non-magnetic insulating material that flows at the time of heating, such as a photoresist or a spin-on-glass (SOG). The insulating layers 38, 39, and 42 each electrically separate the coil 41 from its surroundings.

The upper yoke layer 43 may be formed of a soft magnetic material with high saturation flux density such as CoFe, the forward section thereof is connected to the second layer 352 of the magnetic pole 35, and a part thereof at a backward section is connected to the connecting layer 37. In addition, the forward end surface of the upper yoke layer 43 is located at a position recessed from the ABS 11S.

In the recording head section 16 having the foregoing structure, the write current flowing through the coil 41 generates a magnetic flux inside a magnetic path that is mainly configured by the leading shield 29, the lower yoke layer 28, the connecting layers 30, 36, and 37, the upper yoke layer 43, and the magnetic pole 35. This generates a signal magnetic field near the end surface of the magnetic pole 35 exposed on the ABS 11S, and the signal magnetic field reaches a predetermined region of the recording surface of the magnetic disk 2.

Further, in the magnetic read recording head 10, the protective layer 17 which may be formed of a material similar to that of the cladding layer 33 for example is so formed as to cover the entire upper surface of the recording head section 16. In other words, the cladding layer 33 and the protective layer 17 that are each formed of a material having a lower refractive index compared with the waveguide 32 and high thermal conductivity are so provided as to collectively surround the waveguide 32, the plasmon generator 34, and the magnetic pole 35.

In the magnetic read recording head 10, a first protective film 51 and a second protective film 52 are so formed selectively as to cover the ABS 11S. The first protective film 51 covers, of the ABS 11S, the end surface of the waveguide 32 and the end surface 35S1 of the magnetic pole 35, and has an opening 51K at a region corresponding to an end surface of the forward end 341 in the plasmon generator 34. The second protective film 52 is so provided as to fill the opening 51K and to cover the end surface of the forward end 341 in the ABS 11S. Here, the first protective film 51 may have a thickness that is substantially the same as a thickness of the second protective film 52.

The first protective film 51 is formed of a nonconductive material that is different from a nonconductive material that configures the second protective film 52. More specifically, the first protective film 51 may be formed substantially of a diamond-like carbon (DLC), and the second protective film 52 may be formed substantially of tantalum oxide ($TaO_x$) for example. DLC is superior over $TaO_x$ in mechanical strength such as abrasion resistance property. Hence, a large portion of the ABS 11S is covered with the first protective film 51 formed substantially of DLC, making it possible to protect the magnetic read recording head 10 from damage such as abrasion upon its activation and stoppage. On the other hand, $TaO_x$ is superior over DLC in heat resistance property. Hence, the second protective film 52 that covers the end surface of the forward end 341 where a significant rise in temperature occurs is formed substantially of $TaO_x$, making it possible to prevent degradation of a crystalline structure of the second protective film 52. Further, the second protective film 52 is stable to heat, making it possible to prevent agglomeration of the forward end 341.

Also, the magnetic read recording head 10 may be provided with a third protective film 53 that covers the first protective film 51 and the second protective film 52 as a whole. For example, the third protective film 53 may be made substantially of silicon nitride ($Si_3N_4$), besides DLC. $Si_3N_4$ is lower in oxygen permeability than DLC and is preferable for preventing alteration of the plasmon generator 34 such as oxidation.

Note that the first protective film 51 to the third protective film 53 are only illustrated in FIG. 4, and illustration thereof are omitted in other drawings.

[3. Method of Manufacturing Magnetic Read Recording Head]

A method of manufacturing the magnetic read recording head 10 will be described with reference to FIGS. 7 to 13 in addition to FIG. 4. FIGS. 7 to 13 are perspective views each illustrating a process in the method of manufacturing the magnetic read recording head 10, or are sectional views taken along an YZ plane orthogonal to the ABS 11S.

Figure 7:
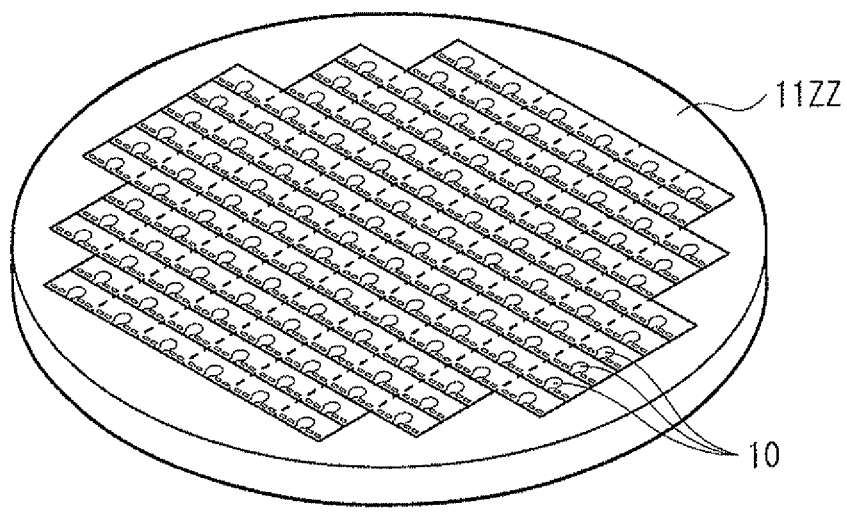
FIG. 7 is a perspective view illustrating a process in a method of manufacturing the magnetic disk unit illustrated in FIG. 1.

First, as illustrated in FIG. 7, a wafer 11ZZ which may be made of, for example, AlTiC is prepared. The wafer 11ZZ serves eventually as a plurality of sliders 11. Thereafter, a plurality of magnetic read recording heads 10 are formed in an array on the wafer 11ZZ as described below.

The magnetic read recording head 10 is manufactured mainly by subsequently forming and stacking a series of components by using an existing thin-film process. Examples of the existing thin-film process include film-forming technique such as electrolytic plating and sputtering, patterning technique such as photolithography, etching technique such as dry etching and wet etching, and polishing technique such as chemical mechanical polishing (CMP).

Here, first, the insulating layer 13 is formed on the slider 11. Then, the lower shield layer 21, the MR element 22 and the insulating layer 24, and the upper shield layer 23 are formed by stacking in this order on the insulating layer 13 to form the read head section 14. Then, the insulating layer 25, the intermediate shield layer 26, and the insulating layer 27 are stacked in order on the read head section 14.

Thereafter, the lower yoke layer 28, the leading shield 29 and the connecting layer 30, the cladding layer 31, the waveguide 32, the cladding layer 33, the plasmon generator 34, the magnetic pole 35, and the connecting layers 36 and 37 are formed in order on the insulating layer 27. Note that a configuration may be employed where the leading shield 29 is omitted. Further, the insulating layer 38 is so formed as to cover an entire part, following which a planarization process is performed to planarize the upper surfaces of the magnetic pole 35, the insulating layer 38, and the connecting layer 37, followed by forming the coil 41 embedded by the insulating layers 39 and 42. Moreover, the upper yoke layer 43 connected with the magnetic pole 35 and the connecting layer 37 is formed to complete the recording head section 16. Thereafter, the protective layer 17 is formed on the recording head section 16. As a result, the plurality of magnetic read recording heads 10 before the formation of the ABS 11S are formed in an array on the wafer 11ZZ (FIG. 7).

Figure 8:
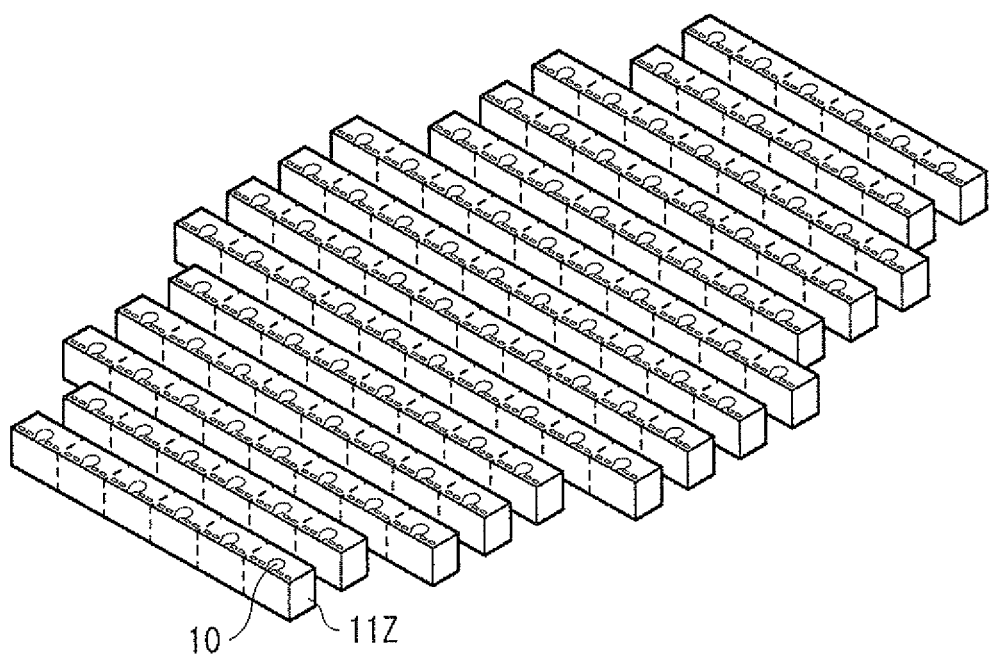
FIG. 8 is a perspective view illustrating a process subsequent to that of FIG. 7.
Figure 9:
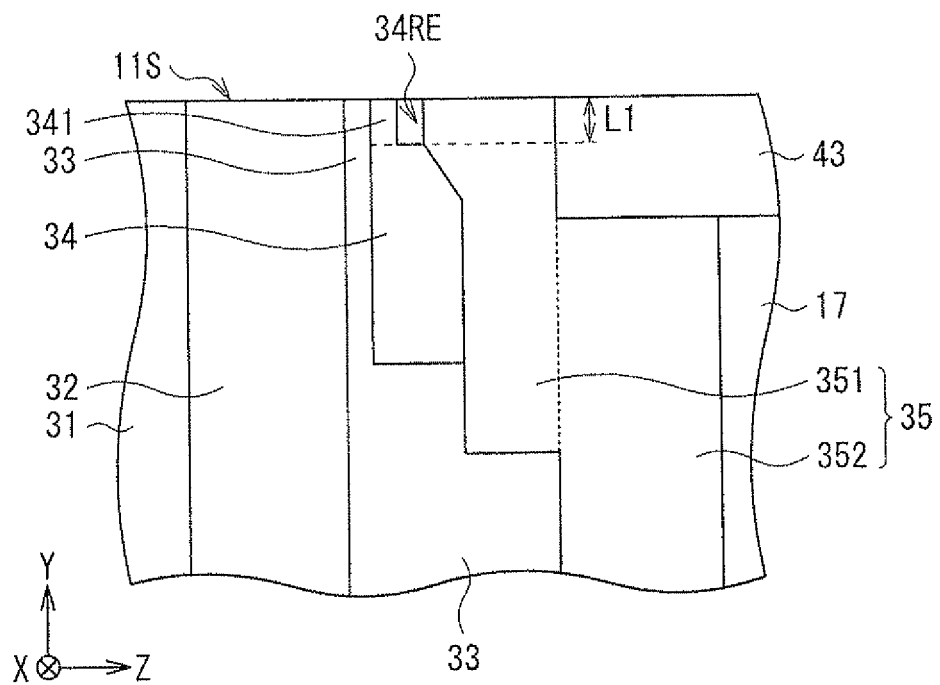
FIG. 9 is a sectional view illustrating a process subsequent to that of FIG. 8.

Thereafter, as illustrated in FIG. 8, the wafer 11ZZ is cut to form a plurality of bars 11Z. The plurality of magnetic read recording heads 10 are formed in line in each of the bars 11Z. Further, one end surface of the bar 11Z, i.e., a side surface of a multilayer from the slider 11 up to the protective layer 17, is collectively polished and/or the like through the CMP method and/or the like to form the ABS 11S (FIG. 9). Here, the length L1 of the forward end 341 of the plasmon generator 34 is adapted to have a predetermined magnitude. Also, desirably, by allowing the laser light to enter the waveguide 32 to generate the near-field light NF from a tip section 34G of the forward end 341 to thereby heat the forward end 341, the agglomeration thereof may be generated in advance before forming the ABS 11S.

Figure 10:
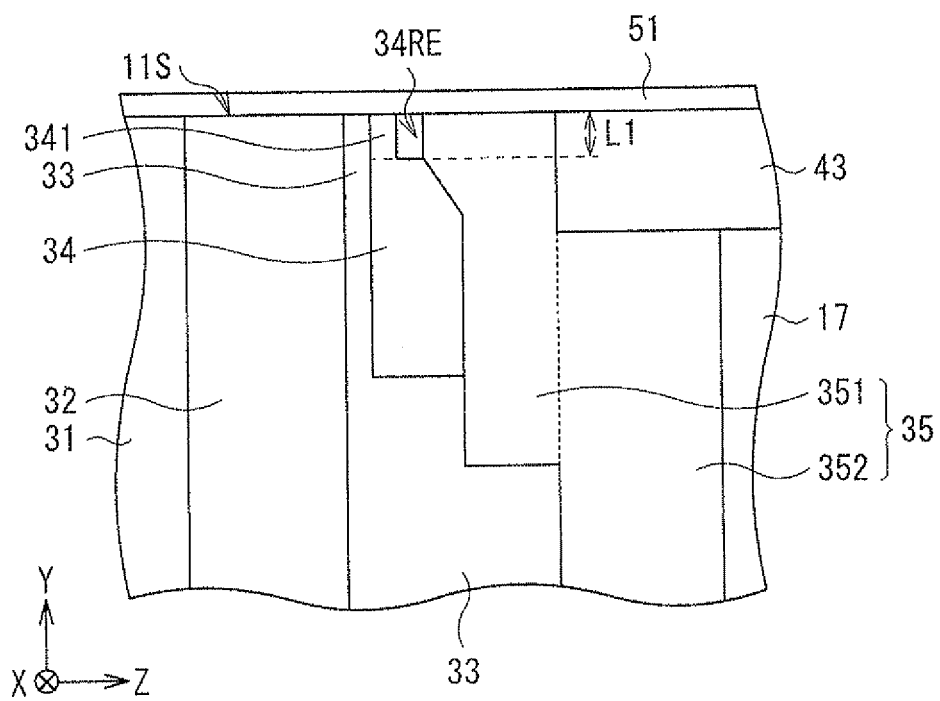
FIG. 10 is a sectional view illustrating a process subsequent to that of FIG. 9.

After forming the ABS 11S, the first protective film 51 is so formed as to cover an entire part of the ABS 11S as illustrated in FIG. 10. The first protective film 51 may be formed using a nonconductive material formed substantially of DLC, for example.

Figure 11:
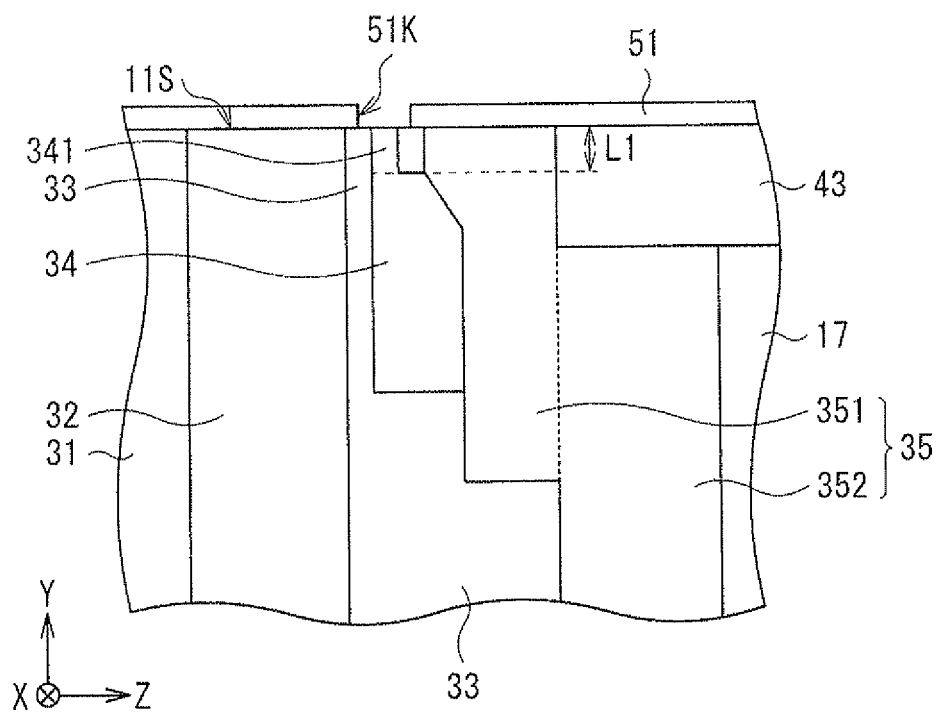
FIG. 11 is a sectional view illustrating a process subsequent to that of FIG. 10.

Then, of the first protective film 51, a section covering the end surface of the forward end 341 of the plasmon generator 34 is selectively removed to form the opening 51K as illustrated in FIG. 11, thereby exposing the end surface of the forward end 341. The opening 51K may be obtained through causing the laser light to enter the waveguide 32 to generate the near-field light NF in the plasmon generator 34 near the ABS 11S, thereby to heat and evaporate the first protective film 51 partially, for example. A size of the opening 51K may be adjusted through varying an intensity of the laser light that enters the waveguide 32, for example.

Figure 12:
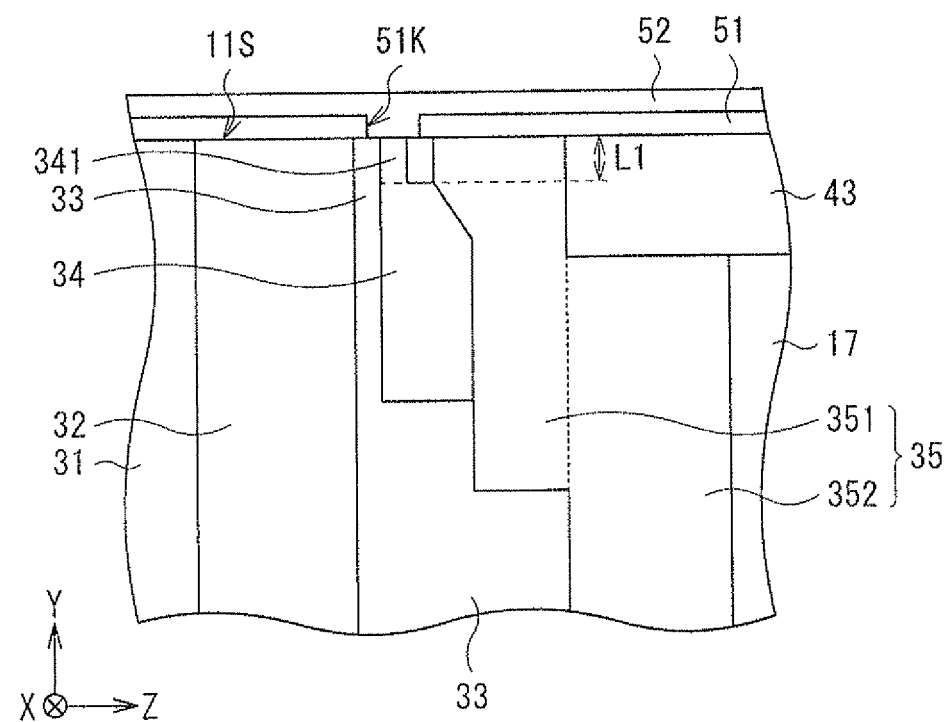
FIG. 12 is a sectional view illustrating a process subsequent to that of FIG.
Figure 13:
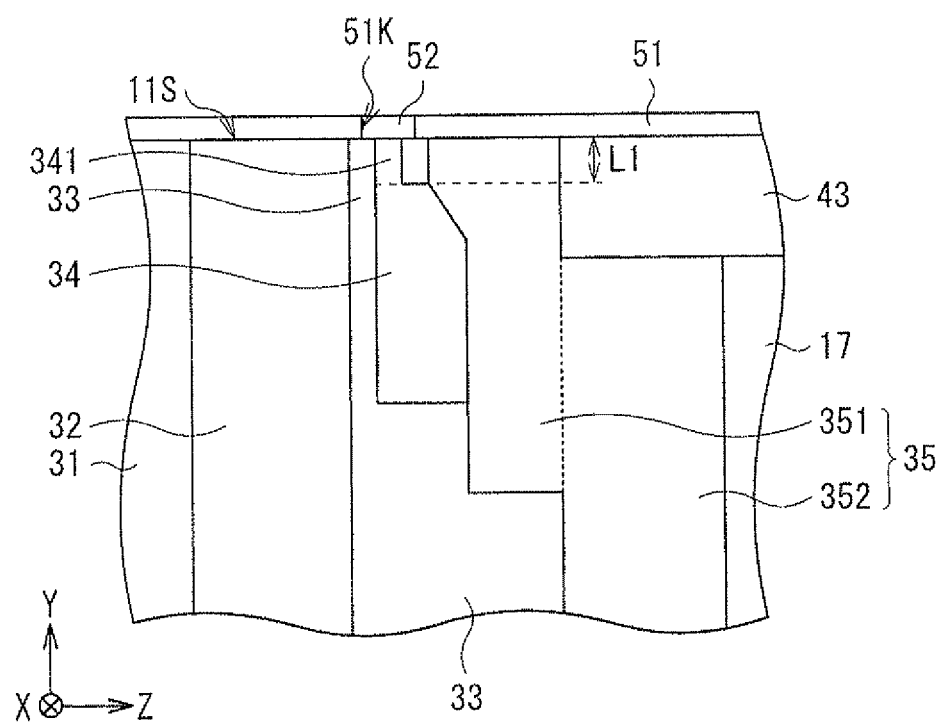
FIG. 13 is a sectional view illustrating a process subsequent to that of FIG. 12.

After forming the opening 51K, the second protective film 52 is so formed as to fill the opening 51K and to cover the end surface of the forward end 341 as well as its neighborhood. Here, the second protective film 52 covering the first protective film 51 may be removed through mechanical polishing and/or the like as necessary (FIG. 13), after so forming the second protective film 52 as to fill the opening 51K and to cover the entire part of the first protective film 51 as illustrated in FIG. 12. The second protective film 52 may be formed using a nonconductive material formed substantially of $TaO_x$, for example.

Thereafter, a heat treatment may be performed on the bars 11Z with temperature conditions to an extent where the MR elements 22 are not damaged (for example, 220 degrees centigrade is maintained for two hours).

Further, the third protective film 53 may be so formed as to cover the first protective film 51 and the second protective film 52 (see FIG. 4).

The foregoing completes the magnetic read recording head 10.

[4. Detailed Structure of Light Source Unit]

Referring again to FIG. 3, a description is given in detail of the light source unit 50.

The light source unit 50 provided at the backward of the magnetic read recording head 10 includes the laser diode 60 as a light source emitting laser light, and a supporting member 70, which may be rectangular-solid in shape for example, supporting the laser diode 60 as illustrated in FIG. 3.

The supporting member 70 may be formed by, for example, a ceramic material such as $Al_2O_3$.TiC. As illustrated in FIG. 3, the supporting member 70 includes a bonded surface 70A to be bonded to a back surface 11B of the slider 11, and a light source mounting surface 70C orthogonal to the bonded surface 70A. The light source mounting surface 70C is parallel to the element forming surface 11A. The laser diode 60 is mounted on the light source mounting surface 70C. Desirably, the supporting member 70 may have a function of a heatsink that dissipates heat generated by the laser diode 60, in addition to the function of supporting the laser diode 60.

Those that are generally used for communication, for optical disc storage, or for material analysis, such as InP-based, GaAs-based, and GaN-based ones, can be applied to the laser diode 60. A wavelength of the laser light emitted from the laser diode 60 may have any value within a range of from 375 nm to 1.7 μm, for example. Specifically, an example includes a laser diode of InGaAsP/InP quaternary mixed crystal with the emission wavelength region of from 1.2 to 1.67 μm. As illustrated in FIG. 3, the laser diode 60 has a multilayer structure including a lower electrode 61, an active layer 62, and an upper electrode 63. An n-type semiconductor layer 65, which may include n-type AlGaN for example, is interposed between the lower electrode 61 and the active layer 62, and a p-type semiconductor layer 66, which may include p-type AlGaN for example, is interposed between the active layer 62 and the upper electrode 63. Each of two cleavage surfaces of the multilayer structure is provided with a reflective layer 64 formed of $SiO_2$, $Al_2O_3$, or the like for totally reflecting light and exciting oscillation. The reflective layer 64 is provided with an opening for allowing laser light to exit therefrom at a position that includes an emission center 62A of the active layer 62. The relative positions of the light source unit 50 and the magnetic read recording head 10 are fixed, by bonding the bonded surface 70A of the supporting member 70 to the back surface 11B of the slider 11, in such a manner that the emission center 62A and the back end surface 32A of the waveguide 32 are coincident with each other. The thickness $T_{LA}$ of the laser diode 60 may be, for example, from about 60 to about 200 μm. When a predetermined voltage is applied between the lower electrode 61 and the upper electrode 63, laser light is emitted from the emission center 62A of the active layer 62, which then enters the back end surface 32A of the waveguide 32. Preferably, the laser light emitted from the laser diode 60 may be polarized light of a TM mode whose electric field oscillates in a direction perpendicular to the surface of the active layer 62. The laser diode 60 may be driven with use of a power source in the magnetic disk unit. The magnetic disk unit usually includes a power source that generates a voltage of about 5 V, for example, and the voltage generated by the power source is sufficient to drive the laser diode 60. In addition, the laser diode 60 consumes power of, for example, about several tens mW, which is sufficiently covered by the power source in the magnetic disk unit.

[5. Control Circuit of Magnetic Disk Unit and Operation]

Next, a circuit configuration of a control circuit of the magnetic disk unit illustrated in FIG. 1 and an operation of the magnetic read recording head 10 will be described with reference to FIG. 14. The control circuit includes a control LSI (large-scale integration) 100, a ROM (read only memory) 101 connected to the control LSI 100, a write gate 111 connected to the control LSI 100, and a write circuit 112 that connects the write gate 111 to the coil 41. The control circuit further includes a constant current circuit 121 connected to the MR element 22 and the control LSI 100, an amplifier 122 connected to the MR element 22, and a demodulation circuit 123 connected to an output end of the amplifier 122 and the control LSI 100. The control circuit further includes a laser control circuit 131 connected to the laser diode 60 and the control LSI 100, and a temperature detector 132 connected to the control LSI 100.

Here, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects a temperature of a magnetic recording layer of the magnetic disk 2 to transmit information on the temperature to the control LSI 100.

The ROM 101 stores therein a control table and the like in order to control an operation current value to be supplied to the laser diode 60.

At the time of write operation, the control LSI 100 supplies the write data to the write gate 111. The write gate 111 supplies the write data to the write circuit 112 only when the write control signal instructs to perform the write operation. The write circuit 112 allows the write current to flow through the coil 41 according to the write data. As a result, a write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs to perform the read operation. An output voltage of the MR element 22 is amplified by the amplifier 122, which is then received by the demodulation circuit 123. The demodulation circuit 123 demodulates the output of the amplifier 122 to generate read data to be provided to the control LSI 100 when the read control signal instructs to perform the read operation.

The laser control circuit 131 controls the supply of operation current to the laser diode 60 based on the laser ON/OFF signal, and controls the value of the operation current supplied to the laser diode 60 based on the operation current control signal. The operation current equal to or larger than an oscillation threshold is supplied to the laser diode 60 by the control of the laser control circuit 131 when the laser ON/OFF signal instructs to perform the ON operation. As a result, the laser light is emitted from the laser diode 60 and the laser light propagates through a core 32. Subsequently, the near-field light NF (described later) is generated from the tip section 34G of the plasmon generator 34. By the near-field light NF, a part of the magnetic recording layer of the magnetic disk 2 is heated, and thus the coercivity in that part is lowered. At the time of writing, the write magnetic field generated from the magnetic pole 35 is applied to the part of the magnetic recording layer where the coercivity is lowered, and thus data recording is performed.

The control LSI 100 determines a value of the operation current of the laser diode 60 with reference to the control table stored in the ROM 101, based on a temperature of the magnetic recording layer of the magnetic disk 2 measured by the temperature detector 132, etc., and controls the laser control circuit 131 with use of the operation current control signal such that the operation current with that value is supplied to the laser diode 60. For example, the control table may include an oscillation threshold of the laser diode 60 and data indicating a temperature dependency of light output-operation current property. The control table may further include data indicating a relationship between the operation current value and an increased amount of the temperature of the magnetic recording layer heated by the near-field light NF, data indicating a temperature dependency of the coercivity of the magnetic recording layer, and the like.

Figure 14:
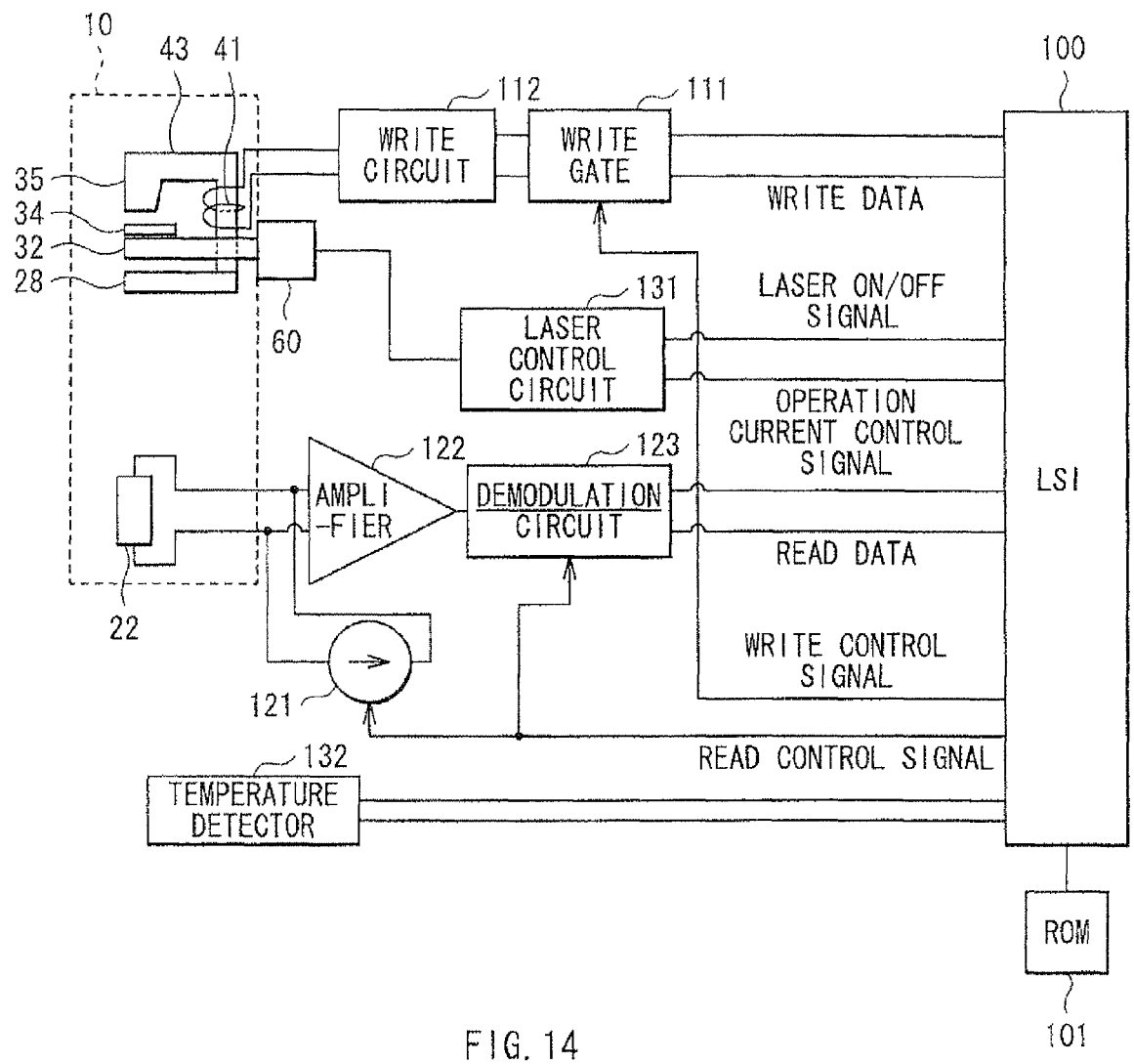
FIG. 14 is a block diagram illustrating a circuit configuration of the magnetic disk unit illustrated in FIG. 1.

The control circuit illustrated in FIG. 14 has a signal system for controlling the laser diode 60, that is, a signal system of the laser ON/OFF signal and the operation current control signal, independent of the control signal system of write-read operation, thereby achieving not only the conduction to the laser diode 60 simply operated in conjunction with the write operation, but also more various modes of conduction to the laser diode 60. Note that the configuration of the control circuit of the magnetic disk unit is not limited to that illustrated in FIG. 14.

Next, a principle of near-field light generation and a principle of thermally-assisted magnetic recording with use of the near-field light according to the present embodiment will be described with reference to FIG. 4.

Laser light 45 emitted from the laser diode 60 propagates through the waveguide 32 to reach the neighborhood of the plasmon generator 34. At this e, the laser light 45 is totally reflected by an evanescent light generating surface 32C that is an interface between the waveguide 32 and a buffer section 33A (a section between the waveguide 32 and the plasmon generator 34, of the cladding layer 33), thereby generating evanescent light 46 that leaks into the buffer section 33A.

Thereafter, the evanescent light 46 couples with charge fluctuation, on a surface plasmon exciting surface 34S1 that faces the waveguide 32 of the plasmon generator 34, to induce a surface plasmon polariton mode. As a result, surface plasmons 47 are excited on the surface plasmon exciting surface 34S1. The surface plasmons 47 propagate on the surface plasmon exciting surface 34S1 toward the ABS 11S.

The surface plasmons 47 eventually reach the ABS 11S, and as a result, the near-field light NF is generated on the tip section 34G. The near-field light NF is radiated toward the magnetic disk 2 (not illustrated in FIG. 4) and reaches the surface of the magnetic disk 2 to heat a part of the magnetic recording layer of the magnetic disk 2, thereby lowering the coercivity of the heated part of the magnetic recording layer. In the thermally-assisted magnetic recording, data writing is performed by applying the write magnetic field generated by the magnetic pole 35 to a part of the magnetic recording layer where the coercivity is thus lowered.

[6. Effects]

According to the magnetic read recording head 10 of the present embodiment, the first protective film 51 and the second protective film 52 are selectively provided on the ABS 11S as described above. Here, the end surface of the forward end 341 of the plasmon generator 34 is covered with the second protective film 52 that is different from the first protective film 51 that covers the end surface of the waveguide 32 and the end surface 35S1 of the magnetic pole 35. This makes it possible to protect the magnetic read recording head 10 with use of materials appropriate to respective applications. For example, configuring the first protective film 51 with use of DLC that is superior in mechanical strength makes it possible to protect the magnetic read recording head 10 from damage such as abrasion upon its activation and stoppage. On the other hand, configuring the second protective film 52 with use of $TaO_x$ that is superior in heat resistance property makes it possible to prevent degradation of the crystalline structure of the second protective film 52, and to prevent agglomeration of the forward end 341. As a result, higher-density magnetic recording is possible, and the product lifetime increases.

Also, in forming the magnetic read recording head 10, the opening 51K is formed utilizing generation of heat at the forward end 341 of the plasmon generator 34. Hence, it is possible to form the opening 51K having a predetermined size accurately and in a simplified manner at a predetermined location.

[Modification]

Next, a modification of the present embodiment will be described.

In the foregoing embodiment, the description has been given of a case where the second protective film 52 is formed substantially of $TaO_x$. The second protective film 52, however, may contain a metal element that is alloyable with a component element of the plasmon generator 34.

More specifically, the metal element mentioned above is one or more of Cu (copper), Co (cobalt), Ni (nickel), Fe (iron), Ta (tantalum), Mg (magnesium), Cr (chromium), Ti (titanium), Ag (silver), Pt (platinum), Pd (palladium), Ru (ruthenium), and Al (aluminum). As for the component element of the plasmon generator 34, Au or Ag is preferable. In particular, preferably, the plasmon generator 34 may be formed of Au, and the second protective film 52 may be a gold-containing alloy formed of an alloy of the metal element described above and Au.

Such configuration makes it possible to cause the second protective film 52 to function as a part of the plasmon generator 34 in essence, and to sufficiently suppress the agglomeration of the forward end 341. As a result, it is possible to efficiently generate the near-field light NF while reducing energy of the laser light that enters the waveguide 32, and also to prevent an increase in distance between the plasmon generator 34 and a surface of the magnetic disk 2. Hence, higher-density magnetic recording is possible.

Incidentally, when manufacturing the magnetic read recording head 10 according to the present modification, desirably, a heat treatment may be performed on the bars 11Z after the formation of the first protective film 51 and the second protective film 52 with temperature conditions to an extent where the MR elements 22 are not damaged (for example, 220 degrees centigrade is maintained for two hours), since the metal element described above heat-diffuses into the forward end 341 and Au and/or the like configuring the forward end 341 heat-diffuses into the second protective film 52 to allow the prevention of the agglomeration of the forward end 341 to be further ensured upon operation.

Examples

Examples of the invention will be described in detail.
[1. Lifetime Test]
(Experiment 1)

A test on lifetime was conducted on the magnetic read recording head 10 according to the invention (samples 1-1 to 1-9). In addition thereto, a similar lifetime test was conducted as comparative examples on a magnetic read recording head that had a configuration similar to that of the invention with the exception of the second protective film 52 which was not provided (samples 2-1 to 2-9).

More specifically, heat with power equivalent to 2.5 times as much as that used in an actual write operation was applied to the magnetic read recording head 10, following which writing of information was performed with the power used in the actual write operation, to measure the time taken for a signal-to-noise ratio (SNR) of a read signal to cause a 2 dB decrease for an initial value. Here, the plasmon generator 34 was formed using Au, the first protective film 51 was formed at a thickness of 3 nm using DLC, and the second protective film 52 was formed at a thickness of 3 nm using Cu. Also, a heat treatment was performed with conditions in which a temperature of 220 degrees centigrade was maintained for two hours after the formation of the first protective film 51 and the second protective film 52.

Figure 15:
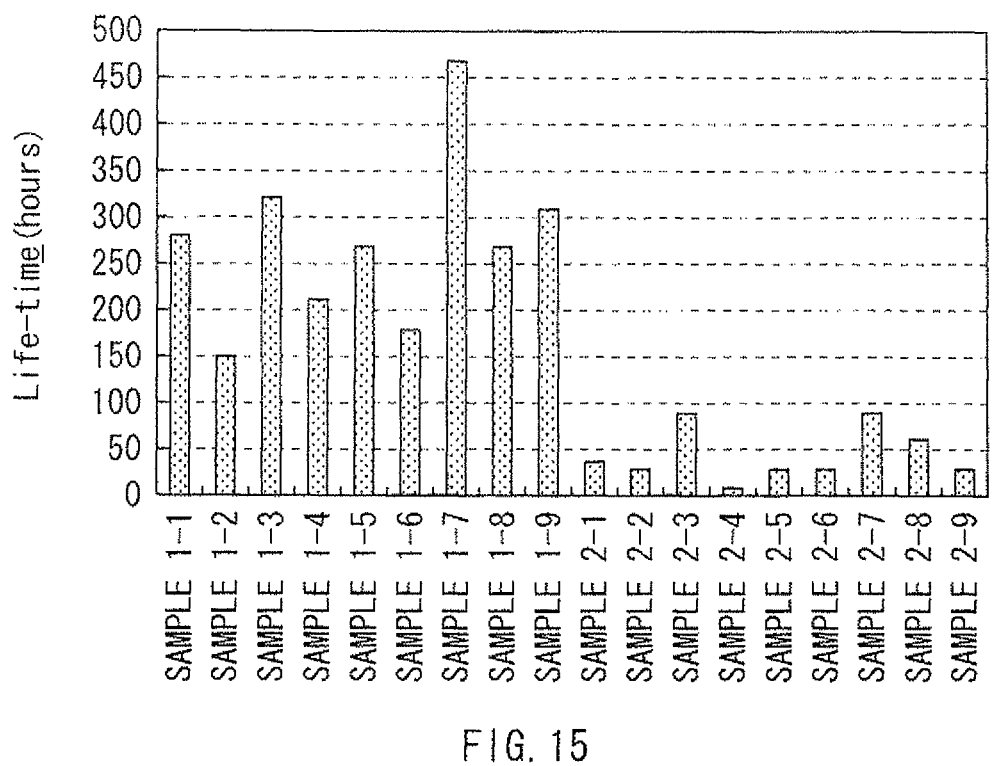
FIG. 15 is a characteristic diagram illustrating a result of a lifetime test according to Experiment 1.

FIG. 15 shows a result of the lifetime test.

As shown in FIG. 15, a significant improvement in lifetime was confirmed in the present experiment (the samples 1-1 to 1-9) as compared with the comparative examples (the samples 2-1 to 2-9).

While the invention has been described with reference to an embodiment, the invention is not limited to the foregoing embodiment and various modifications may be made. For example, the thermally-assisted magnetic recording head of the invention is not limited to that described in the foregoing embodiment in configurations (such as shapes and positional relationships) of the waveguide, the plasmon generator, the magnetic pole, etc., and the thermally-assisted magnetic recording head may have any other configuration.

Correspondence relationships between the reference numerals and the components in the present embodiment are collectively illustrated as follows.

1 ... housing, 2 ... magnetic disc, 3 ... head arm assembly (HAA), 4 ... head gimbals assembly (HGA), 4A ... magnetic head device, 4B ... suspension, 5 ... arm, 6 ... driver, 7 ... fixed shaft, 8 ... bearing, 9 ... spindle motor, 10 ... magnetic read recording head, 11 ... slider, 11A ... element forming surface, 11B ... back surface, 11S ... air bearing surface (ABS), 12 ... element forming layer, 13 ... insulating layer, 14 ... read head section, 16 ... recording head section, 17 ... protective layer, 21 ... lower shield layer, 22 ... MR element, 23 ... upper shield layer, 24, 25, 27, 38, 39, 42 ... insulating layer, 26 ... intermediate shield layer, 28 ... lower yoke layer, 29 ... leading shield, 30, 36, 37 ... connecting layer, 31, 33 ... cladding layer, 32 ... waveguide, 34 ... plasmon generator, 341 ... forward end, 34G ... tip section, 34S1 ... surface plasmon exciting surface, 35 ... magnetic pole, 351 ... first layer, 352 ... second layer, 41 ... coil, 43 ... upper yoke layer, 45 ... laser light, 46 ... evanescent light, 47 ... surface plasmon, 100 ... LSI, 101 ... ROM, 111 ... write gate, 121 ... constant current circuit, 122 ... amplifier, 123 ... demodulation circuit, 131 ... laser control circuit, 132 ... temperature detector, NF ... near-field light.

What is claimed is:

1. A thermally-assisted magnetic recording head, comprising:
a waveguide having a first end surface included in an air bearing surface;
a magnetic pole having a second end surface included in the air bearing surface;
a plasmon generator having a third end surface included in the air bearing surface;
a first film covering the first end surface of the waveguide and the second end surface of the magnetic pole, and having an opening in a region corresponding to the third end surface of the plasmon generator; and
a second film filling the opening and covering the third end surface of the plasmon generator.

2. The thermally-assisted magnetic recording head according to claim 1, wherein the first film has a thickness substantially same as a thickness of the second film.

3. The thermally-assisted magnetic recording head according to claim 1, wherein the first film is formed of a first nonconductive material, and the second film is formed of a second nonconductive material different from the first nonconductive material.

4. The thermally-assisted magnetic recording head according to claim 3, wherein the first nonconductive material is substantially diamond-like carbon, and the second nonconductive material is substantially tantalum oxide ($TaO_x$).

5. The thermally-assisted magnetic recording head according to claim 1, wherein the second film contains one or more metal elements alloyable with a component element of the plasmon generator.

6. The thermally-assisted magnetic recording head according to claim 5, wherein the component element of the plasmon generator is substantially Au (gold), and the one or more metal elements are selected from a group consisting of Cu (copper), Co (cobalt), Ni (nickel), Fe (iron), Ta (tantalum), Mg (magnesium), Cr (chromium), Ti (titanium), Ag (silver), Pt (platinum), Pd (palladium), Ru (ruthenium), and Al (aluminum).

7. The thermally-assisted magnetic recording head according to claim 1, wherein the second film is formed of an alloy.

8. The thermally-assisted magnetic recording head according to claim 7, wherein the plasmon generator is formed substantially of Au (gold), and the second film is formed substantially of a gold-containing alloy.

9. The thermally-assisted magnetic recording head according to claim 8, wherein the gold-containing alloy is an alloy of Au (gold) and one or more elements selected from a group consisting of Cu (copper), Co (cobalt), Ni (nickel), Fe (iron)

Ta (tantalum), Mg (magnesium), Cr (chromium), Ti (titanium), Ag (silver), Pt (platinum), Pd (palladium), Ru (ruthenium), and Al (aluminum).

10. The thermally-assisted magnetic recording head according to claim 1, further comprising a third film containing silicon nitride ($Si_3N_4$) and covering the first film and the second film.

11. The thermally-assisted magnetic recording head according to claim 1, wherein the plasmon generator is provided between the waveguide and the magnetic pole.

12. A head gimbals assembly, comprising:
a magnetic head slider having a side surface, the side surface including the thermally-assisted magnetic recording head according to claim 1; and
a suspension having an end, the end being attached with the magnetic head slider.

13. A head arm assembly, comprising:
a magnetic head slider having a side surface, the side surface including the thermally-assisted magnetic recording head according to claim 1;
a suspension having a first end and a second end, the first end being attached with the magnetic head slider; and
an arm supporting the suspension at the second end thereof.

14. A magnetic disk unit with a magnetic recording medium and a head arm assembly, the head arm assembly comprising:
a magnetic head slider having a side surface, the side surface including the thermally-assisted magnetic recording head according to claim 1;
a suspension having a first end and a second end, the first end being attached with the magnetic head slider; and
an arm supporting the suspension at the second end thereof.

15. The thermally-assisted magnetic recording head according to claim 1, wherein the second film extends parallel to and is in contact with the third end surface.

16. The thermally-assisted magnetic recording head according to claim 1, wherein the first film is a non-conductive film.

17. A method of manufacturing a thermally-assisted magnetic recording head, the method comprising:
forming an air bearing surface through polishing an end surface of a multilayer, the multilayer including a waveguide, a magnetic pole, and a plasmon generator;
so forming a first film as to cover the air bearing surface;
forming an opening through selectively removing a part, of the first film, that covers the plasmon generator; and
so forming a second film as to fill the opening and to cover an end surface, included in the air bearing surface, of the plasmon generator.

18. The method of manufacturing the thermally-assisted magnetic recording head according to claim 17, wherein the opening is formed through generating near-field light in the plasmon generator near the air bearing surface, thereby to heat the first film and to evaporate the first film.

19. The method of manufacturing the thermally-assisted magnetic recording head according to claim 17, wherein
the first film is formed by a first nonconductive material formed substantially of a diamond-like carbon, and
the second film is formed by a second nonconductive material formed substantially of tantalum oxide ($TaO_x$).

20. The method of manufacturing the thermally-assisted magnetic recording head according to claim 17, wherein the second film is formed by a metal material that contains one or more metal elements alloyable with a component element of the plasmon generator.

21. The method of manufacturing the thermally-assisted magnetic recording head according to claim 20, wherein
the plasmon generator is formed using Au (gold), and
the second film is formed using the metal material that contains the one or more metal elements selected from a group consisting of Cu (copper), Co (cobalt), Ni (nickel), Fe (iron) Ta (tantalum), Mg (magnesium), Cr (chromium), Ti (titanium), Ag (silver), Pt (platinum), Pd (palladium), Ru (ruthenium), and Al (aluminum).

22. The method of manufacturing the thermally-assisted magnetic recording head according to claim 17, further comprising so forming a third film as to cover the first film and the second film, the third film containing silicon nitride ($Si_3N_4$).

* * * * *